Patented July 25, 1950

2,516,591

UNITED STATES PATENT OFFICE 2,516,591

FILLED POLYMER COMPOSITIONS

Ward Jepson Remington, Nutley, N. J., assignor to E. I. du Pont de Nemours & Company, Wilmington, Del., a corporation of Delaware No Drawing. Application July 15, 1948, Serial No. 38,949

8 Claims. (Cl. 260—41.5)

This invention relates to filled polymer compositions and more particularly to novel plastic compositions suitable for use as floor and wall coverings.

It is an object of this invention to prepare new compositions of matter which have improved properties over the conventional linoleum-type floor coverings, the said new compositions being based on synthetic polymers. Another object is to prepare synthetic compositions particularly for use as floor and wall coverings which have improved properties over the vinyl type polymer compositions. The latter compositions although offering many advantages over inlaid linoleums, such as lack of a need for waxing, excellent wear resistance, flexibility and resilience, exhibit such disadvantages as having poor dimensional stability and of being highly plasticized in order to obtain sufficiently high flexibility. Such highly plasticized compositions tend to embrittle and lose plasticizer upon aging.

Highly satisfactory new and useful compositions have now been found which offer advantages over both linoleum and vinyl polymer compositions for floor and wall coverings, as well as other applications. These novel compositions which are the subject of this invention comprise chlorinated polythene, as hereinafter defined, containing uniformly dispersed therein between 65 parts and 115 parts by weight of finely divided precipitated hydrated calcium silicate per 100 parts by weight of chlorinated polythene. The compositions of this invention may be further improved when greater low temperature flexibility and lower stiffness are desired by preparing compositions comprising chlorinated polythene containing 65 parts to 115 parts of finely divided precipitated hydrated calcium silicate and from 20 to 30 parts of a synthetic elastomer uniformly dispersed in the chlorinated polythene, all parts being by weight based on 100 parts of chlorinated polythene.

Chlorinated polythene suitable for use in this invention may be prepared by chlorinating the normally solid polymers of ethylene described by Fawcett et al. in U. S. Patent 2,153,553. The polymers of ethylene for use in this invention should be in a non-compacted form and should have an average molecular weight of between approximately 12,000 and 35,000. The said molecular weight is determined by measuring the viscosity of dilute solutions as described by Staudinger in Zeitsch. Phys. Chem., 129, 171 (1934). These polymers are dispersed in water followed by sufficient chlorination to yield chlorinated polythenes containing between approximately 20% and 35% by weight of chlorine. The method for preparing the chlorinated polythene of this invention is more fully described in U. S. copending application Serial Number 686,149, filed July 25, 1946 in the name of Robert S. Taylor, now abandoned. The amount of chlorine in the chlorinated polythene is necessarily limited to the approximate range of 20 to 35% by weight since the use of chlorinated polythene having major deviations outside of this range does not yield the desired combination of properties when combined with the precipitated hydrated calcium silicate of this invention. The range of chlorine content of the polymer is not sharply critical, but is only approximate.

Numerous fillers used for reinforcing natural and synthetic polymers were tested in chlorinated polythene as indicated in the examples to follow, but of all those tested precipitated hydrated calcium silicate was the only filler which when combined with the particular polymers of this invention resulted in compositions which possess a satisfactory combination of indentation resistance, low temperature flexibility, mar resistance and other properties necessary for use as floor and wall coverings.

Precipitated hydrated calcium silicate is available commercially under the name of "Silene" EF, which has an average particle size of 27 millimicrons. However, it is believed that any precipitated hydrated calcium silicate which is finely divided, that is having an average particle size of less than 50 millimicrons, may be used in the practice of this invention.

In preparing the compositions of this invention some caution must be used since the precipitated hydrated calcium silicate is somewhat difficult to compound with the chlorinated polythene. The preferred method of compounding is to work the ingredients in a heated Banbury mixer, which has been found to give the best dispersion. The ingredients may also be compounded on a rubber mill having heated differential-speed rolls. Uniform speed rolls may also be employed where the ingredients are mixed in a ball mill either alone or with sufficient solvent, such as alcohol, to form a paste prior to compounding on the said uniform speed rolls. Hence, ball milling followed by Banbury mixing or rolling constitutes another method of preparing the subject compositions. If desired a concentrated master batch of the filler in the chlorinated polythene may be prepared and then diluted with chlorinated polythene to reduce the total filler loading to the desired amount. Small amounts of other additives may be incorporated in the compositions of this invention such as solvents, dispersing agents, light stabilizers, heat stabilizers, antioxidants, lubricants, plasticizers, pigments and the like.

The following examples in which all parts are by weight unless otherwise specified illustrate specific embodiments of this invention.

The percent indentation in the following examples was determined as described in Report BMS-14, "Building Material and Structures" by the National Bureau of Standards. Using a 150 pound load on the indentation tester and maintaining this load for 30 seconds on the samples tested (strips 1" x 8" x 0.125"), the identation is calculated as follows:

$$\text{Indentation, percent} = \frac{t_o - t_i}{t_o} \times 100$$

where $t_o$ = original thickness in mils.
$t_i$ = thickness after indentation in mils.

An indentation of 40% or less is considered the most desirable for floor covering compositions.

The low temperature flexibility as indicated in the said examples was determined by conditioning a test strip of the composition 1" x 8" x 0.125" in a refrigerator at 32° F. for 2 hours followed by bending it around a mandrel at 32° F. Several mandrels were prepared varying in diameter from 1" to 8". Compositions which can be bent around a mandrel 4" or more in diameter without breaking at 32° F. are considered satisfactory for floor covering applications.

The mar resistance was rated qualitatively by a simple test. A strip 1" x 8" x 0.125" was scraped by a sharp pointed instrument. If the resulting scratch appeared white, the mar resistance was considered poor, whereas if there was no color change after scratching, the mar resistance was considered very good.

Example I

A composition containing 100 parts of chlorinated polythene; 5 parts of stearamide; 3.95 parts of red pigment; and 87.7 parts of precipitated hydrated calcium silicate having an average particle size of 27 millimicrons was prepared by milling the precipitated hydrated calcium silicate filler together with the other additives into the chlorinated polythene on hot rolls for 10 minutes at a temperature of 250° to 270° F. The chlorinated polythene used contained 27% chlorine by weight and was made according to the method described in U. S. patent application Serial No. 686,149, filed July 25, 1946, in the name of Robert S. Taylor. This composition was sheeted out on rolls to a thickness of 0.085 inch. The test strips used for determining the heretofore mentioned properties were prepared by assembling several 0.085 inch sheets and press polishing to 0.125 inch. This filled polymer composition manifested a percent indentation of 30, a low temperature flex break at 2 inches and the mar resistance of this composition was determined as fair.

Example II

A composition containing 100 parts of chlorinated polythene; 5 parts of stearamide; 0.35 part of octyl phenol; 1.75 parts of green pigment; and 70 parts of precipitated hydrated calcium silicate was prepared by mixing in a Banbury mixer while maintaining the stock temperature at 350° to 400° F. The chlorinated polythene used contained 27% chlorine by weight and was made according to the method described in U. S. patent application Serial No. 686,149, filed July 25, 1946, in the name of Robert S. Taylor. Samples of this composition were sheeted out on rolls to a thickness of 0.085 inch. The test strips used for determining the properties listed above were prepared by assembling several 0.085 inch sheets and press polishing to 0.125 inch. This filled polymer composition manifested an indentation of 40%, a low temperature flex break at 2 inches, and the mar resistance of this composition was deemed good.

Example III

A composition containing 100 parts of chlorinated polythene; 5.3 parts of microcrystalline wax; 2.1 parts glycidyl laurate; 115 parts of precipitated hydrated calcium silicate having an average particle size of 27 millimicrons and known commercially as "Silene" EF was prepared by miling the indicated amount of precipitated hydrated calcium silicate filler together with the other additives into the chlorinated polythene on hot rolls for 10 minutes at a temperature of 250° to 270° F. The chlorinated polythene used in this composition contains 27% by weight of chlorine and was made according to the method described in U. S. patent application Serial No. 686,149, filed July 25, 1946, in the name of Robert S. Taylor. The test samples of this composition were sheeted out on rolls to a thickness of 0.085 inch. The test strips used for determining the heretofore indicated properties were prepared by assembling several 0.085 inch sheets and press polishing to 0.125 inch. This filled polymer composition manifested an indentation of 13%, a low temperature flex break at 2 inches, and the mar resistance was considered fair.

Example IV

A composition containing 100 parts of chlorinated polythene; 5 parts stearamide; 0.4 part octyl phenol; 110 parts of finely divided precipitated hydrated calcium silicate having an average particle size of 27 millimicrons and known commercially as "Silene" EF; 25 parts of a synthetic elastomeric copolymer of butadiene and acrylonitrile and known commercially as "Hycar" OR-15 was prepared in a Banbury mixer with a stock temperature at 350°-400° F. The chlorinated polythene used contained 27% by weight chlorine and was made according to the method described in U. S. patent application Serial No. 686,149, filed July 25, 1946, in the name of Robert S. Taylor. All samples were sheeted out on rolls to a thickness of 0.085 inch. The test strips used for determining the above indicated properties were prepared by assembling several 0.085 inch sheets and press polishing to 0.125 inch. This filled polymer composition indicated an indentation of 40% and a very good low temperature flex break in that the test strip did not break at 1 inch. The mar resistance of this composition was good.

Example V

A composition containing 100 parts of chlorinated polythene; 2.1 parts of dicyandiamide; 146 parts of precipitated and coated calcium carbonate having an average particle size of less than 100 millimicrons and known commercially as "Calcene" T; 5.3 parts of a mixture of chlorinated diphenyls and known as "Aroclor" 5460 was prepared by mixing in a Banbury mixer with the stock temperature at 350°–400° F. The chlorinated polythene used contained 27% chlorine by weight and was made in accordance with the method described in U. S. patent application Serial No. 686,149, filed July 25, 1946, in the name of Robert S. Taylor. All samples were sheeted out on rolls to a thickness of 0.085 inch. The test strips used for determining the properties of this composition were prepared by assembling several 0.085 inch sheets and press polishing to 0.125 inch. This filled polymer composition manifested an indentation of 38%, a low temperature flex break of 4 inches and the mar resistance property was considered poor.

*Example VI*

A composition containing 100 parts of chlorinated polythene, 5 parts of aluminum monostearate and 115 parts of what is commercially known as "Perlite" and more particularly is a volcanic glass which is a coarse silica, 96% of which passes through a No. 325 U. S. sieve was prepared by milling the indicated amount of silica filler together with the other additive on to hot rolls for 10 minutes at a temperature of 250°–270° F. The chlorinated polythene used contained 27% chlorine by weight and was made according to the method described in U. S. patent application Serial No. 686,149, filed July 25, 1946, in the name of Robert S. Taylor. All the test samples of this composition were sheeted out on rolls to a thickness of 0.085 inch. The test strips used for determining the properties noted above were prepared by assembling several 0.085 inch sheets and press polishing to 0.125 inch. This filled polymer composition indicated an indentation of 35%, and a low temperature flex break at 8". This composition was of dark color.

*Example VII*

A composition containing 100 parts of chlorinated polythene; 5 parts aluminum monostearate; 157 parts of fibrous magnesium silicate, 99% of which passes a No. 325 U. S. sieve (i. e., average particle size of approximately 20 microns), and known commercially as "Abestine" 3X was prepared by milling the indicated amount of magnesium silicate filler together with the other additive into the chlorinated polythene on hot rolls for 10 minutes at a temperature of 250°–270° F. The chlorinated polythene used contained 27% chlorine by weight and was manufactured according to the method described in U. S. patent application Serial No. 686,149, filed July 25, 1946, in the name of Robert S. Taylor. All the test samples of this composition were sheeted out on rolls to a thickness of 0.085 inch. The test strips used for determining the above indicated properties were prepared by assembling several 0.085 inch sheets and press polishing to 0.125 inch. This filled polymer composition indicated an indentation of 36%, a low temperature flex break of 4 inches and the mar resistant quality was poor.

*Example VIII*

A composition containing 100 parts of chlorinated polythene; 5 parts of aluminum monostearate; 145 parts of magnesium silicate of which approximately 90% passes through a No. 325 U. S. sieve and known commercially as "Vermiculite" was prepared by milling the indicated amount of magnesium silicate filler together with the other additive into the chlorinated polythene on hot rolls for 10 minutes at a temperature of 250° to 270° F. The chlorinated polythene used contained 27% chlorine by weight and was made according to the method described in U. S. patent application Serial No. 686,149, filed July 25, 1946, in the name of Robert S. Taylor. All samples of this composition were sheeted out on rolls to a thickness of 0.085 inch. The test strips used for determining the properties indicated above were prepared by assembling several 0.085 inch sheets and press polishing to 0.125 inch. This filled polymer composition indicated an indentation of 37% and a low temperature flex break of 4 inches. This polymer composition was dark in color.

The advantages of precipitated hydrated calcium silicate over other fillers incorporated in chlorinated polythene are very apparent from the above examples wherein the percentage indentation, low temperature flexibility and mar resistance of the compositions are indicated. The precipitated hydrated calcium silicate used in the above examples is known commercially as "Silene" EF which has an average particle size of 27 millimicrons. Example IV illustrates the use of an elastomer together with precipitated hydrated calcium silicate in chlorinated polythene for lowering the stiffness and improving the low temperature flexibility of the compositions of the type indicated in Examples I, II and III. Examples V, VI, VII and VIII employ various other fillers in loadings sufficiently high to obtain indentations of less than 40%. It will be apparent in Examples V, VI, VII and VIII that the filler loading is so high that the compositions possess poor low temperature flexibility. The compositions of Examples I, II, III, and IV illustrate preferred embodiments of this invention and have satisfactory properties for commercial floor and/or wall coverings. The above examples illustrate compositions which contain not only the essential basic ingredients but also contain various additives which may act as solvents, dispersing agents, light stabilizers, heat stabilizers, antioxidants, lubricants, plasticizers, pigments and the like. It is to be emphasized that these latter additives are not essential ingredients of the invention herein described.

The most important properties to be considered in preparing synthetic compositions satisfactory for use as floor coverings are indentation resistance, low temperature flexibility, mar resistance and dimensional stability. The proportion of precipitated hydrated calcium silicate which can be used in the practice of this invention is limited if the optimum values for the above and other properties are to be obtained. The lower limit of 65 parts of the said precipitated hydrated calcium silicate per hundred parts of chlorinated polythene is governed by loss of indentation resistance, for the use of filler loading below 65 parts results in indentations of much higher than 40%, which renders these high indentation compositions useless for such applications as floor coverings. The upper limit of filler loading is governed by rapidly increasing stiffness and loss of low temperature flexibility combined with great difficulty in compounding the filler with the polymer. Loadings greater than 115 parts of filler per 100 parts of the chlorinated polythene yield compositions which break at 8" in the low temperature flex test at 32° F. Furthermore, these higher loadings are too stiff for easy working in a Banbury mixer or on rolls. Within the range of 65 to 115 parts of filler per 100 parts of chlorinated polythene the preferred range of loading is from 70 to 90 parts of filler for floor and wall covering applications.

In order to decrease the stiffness and increase the low temperature flexibility and toughness of the compositions of this invention it has been found possible to modify the compositions by incorporating therein a synthetic elastomer in amounts from 20 to 30 parts per 100 parts of chlorinated polythene. The synthetic elastomer may be one from the group consisting of diolefin polymers and copolymers, e. g., butadiene/styrene copolymer, butadiene/acrylonitrile copolymer, polychloroprene, or other olefinic polymers and copolymers of a rubbery nature such as ethylene/vinyl acetate copolymers, chlorosulfonated polythene, and polyisobutylene. The synthetic elastomers used in this invention should be unplasticized. Within the range of elastomer used, that is, 20 to 30 parts per 100 parts of chlorinated polythene, the proportion is so low that curing is not necessary to obtain optimum properties.

The compositions of this invention show improvements over the inlaid linoleum floor coverings in increased abrasion resistance, increased indentation resistance and increased chemical resistance. In addition, the compositions of this invention indicate improved dimensional stability, improved low temperature flexibility, lower specific gravity, higher tear resistance and improved color stability of properly pigmented compositions, over the conventional vinyl polymer compositions used in floor covering applications. The compositions of Examples I, II, III, and IV above have a dimensional stability of 0.0% shrinkage as compared with 0.7% for a commercial polyvinyl chloride floor covering. The dimensional stability was determined by aging test strips for 15 days at 165° F., and then measuring the percent shrinkage of the said strip.

Although most of the emphasis has been placed on the use of compositions of this invention for floor and wall coverings, it is to be understood that these compositions have many other applications. Among the other uses may be mentioned stair treads, counter tops, chair coverings, electrical insulation, wire coatings and the like.

As many apparently widely different embodiments of this invention may be made without departing from the spirit and scope thereof, it is to be understood that this invention is not limited to the specific embodiments thereof except as defined in the appended claims.

I claim:
1. A composition of matter comprising a chlorinated solid polythene containing from 20 to 35% by weight of chlorine; and per 100 parts by weight of said chlorinated polythene, from 65 to 115 parts by weight of finely divided precipitated hydrated calcium silicate.

2. A composition of matter comprising a chlorinated solid polythene containing from 20 to 35% by weight of chlorine; and per 100 parts by weight of said chlorinated polythene, from 65 to 115 parts by weight of finely divided precipitated hydrated calcium silicate and from 20 to 30 parts by weight of a rubbery synthetic olefinic polymer from the group consisting of butadiene/styrene copolymer, butadiene/acrylonitrile copolymer, polychloroprene, ethylene/vinyl acetate copolymer, chlorosulfonated solid polythene, and polyisobutylene.

3. A composition of matter comprising a chlorinated solid polythene containing from 20 to 35% by weight of chlorine; and per 100 parts by weight of said chlorinated polythene, from 65 to 115 parts by weight of finely divided precipitated hydrated calcium silicate having an average particle size less than 50 millimicrons.

4. A composition of matter comprising a chlorinated solid polythene containing from 20 to 35% by weight of chlorine; and per 100 parts by weight of said chlorinated polythene, from 65 to 115 parts by weight of finely divided precipitated hydrated calcium silicate having an average particle size less than 50 millimicrons and from 20 to 30 parts by weight of a rubbery synthetic olefinic polymer from the group consisting of butadiene/styrene copolymer, butadiene/acrylonitrile copolymer, polychloroprene, ethylene/vinyl acetate copolymer, chlorosulfonated solid polythene, and polyisobutylene.

5. A composition of matter comprising a chlorinated solid polythene containing from 20 to 35% by weight of chlorine; and per 100 parts by weight of said chlorinated polythene, from 70 to 90 parts by weight of finely-divided precipitated hydrated calcium silicate.

6. A composition of matter comprising a chlorinated solid polythene containing from 20 to 35% by weight of chlorine; and per 100 parts by weight of said chlorinated polythene, from 70 to 90 parts by weight of finely-divided precipitated hydrated calcium silicate having an average particle size less than 50 millimicrons.

7. A composition as set forth in claim 2 wherein said rubbery synthetic olefinic polymer is a butadiene/acrylonitrile copolymer.

8. A composition as set forth in claim 2 wherein said rubbery synthetic olefinic polymer is chlorosulfonated solid polythene.

WARD JEPSON REMINGTON.

REFERENCES CITED

The following references are of record in the file of this patent:

FOREIGN PATENTS

| Number | Country | Date |
|---|---|---|
| 560,168 | Great Britain | Mar. 23, 1944 |
| 579,769 | Great Britain | Aug. 15, 1946 |

OTHER REFERENCES

Polythene, Physical and Chemical Properties, by Hahn et al., page 526, Industrial and Engineering Chemistry, June 1945.

Certificate of Correction

Patent No. 2,516,591                                                                                   July 25, 1950

WARD JEPSON REMINGTON

It is hereby certified that error appears in the printed specification of the above numbered patent requiring correction as follows:

Column 5, line 46, for ' "Abestine" ' read *"Asbestine"*; column 6, line 60, for the word "loading" read *loadings*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*